US007577706B2

(12) United States Patent
Arregui et al.

(10) Patent No.: US 7,577,706 B2
(45) Date of Patent: Aug. 18, 2009

(54) INTEGRATING A DOCUMENT MANAGEMENT SYSTEM WITH A WORKFLOW SYSTEM AND METHOD

(75) Inventors: Damian Arregui, Grenoble (FR); Francois Pacull, Crolles (FR); Jutta Willamowski, Grenoble (FR); Stefania Castellani, Meylan (FR)

(73) Assignee: Xerox Corporation, Norwalk, CT (US)

( * ) Notice: Subject to any disclaimer, the term of this patent is extended or adjusted under 35 U.S.C. 154(b) by 956 days.

(21) Appl. No.: 10/707,143

(22) Filed: Nov. 24, 2003

(65) Prior Publication Data

US 2005/0114760 A1    May 26, 2005

(51) Int. Cl.
    *G06F 15/16* (2006.01)
(52) U.S. Cl. ............... 709/206; 709/205; 709/207
(58) Field of Classification Search .......... 709/206, 709/205, 207
    See application file for complete search history.

(56) References Cited

U.S. PATENT DOCUMENTS

| | | | |
|---|---|---|---|
| 5,933,827 A * | 8/1999 | Cole et al. | 707/10 |
| 6,029,175 A * | 2/2000 | Chow et al. | 707/104.1 |
| 6,330,689 B1 * | 12/2001 | Jin et al. | 714/15 |
| 6,340,931 B1 | 1/2002 | Harrison et al. | 340/572.1 |
| 6,342,830 B1 | 1/2002 | Want et al. | 340/10.1 |
| 6,422,474 B1 | 7/2002 | Gossweiler, III et al. | 235/492 |
| 6,446,208 B1 | 9/2002 | Gujar et al. | 713/185 |
| 6,493,731 B1 | 12/2002 | Jones et al. | 707/501.1 |
| 6,505,219 B1 | 1/2003 | MacLean et al. | 707/530 |
| 6,542,083 B1 | 4/2003 | Richley et al. | 340/825.49 |
| 6,573,916 B1 | 6/2003 | Grossweiler, III et al. | 345/850 |
| 6,584,466 B1 * | 6/2003 | Serbinis et al. | 707/10 |
| 7,099,872 B2 * | 8/2006 | Carpenter et al. | 707/10 |

(Continued)

FOREIGN PATENT DOCUMENTS

EP        1111518 A2      6/2001

OTHER PUBLICATIONS

Damian Arregui, Francois Pacull, Jutta Willamowski, "Yaka: Document Notification and Delivery Across Heterogeneous Document Repositories", in Proceedings of CRIWG 2001, Darmstadt, Germany, Sep. 6-8, 2001.
Coordination Technologies, Projects: Yaka, (Available on the Internet, May 2003 at: http://www.xrce.xerox.com/.
Flowport User Guide, Version 2.1, Nov. 2000 (see in particular Chapter 3).

(Continued)

*Primary Examiner*—Vivek Srivastava
*Assistant Examiner*—Lin Liu
(74) *Attorney, Agent, or Firm*—Oliff & Berridge, PLC

(57) ABSTRACT

A document management system includes one or more document repositories for storing documents and a document notification and delivery service (DNDS) for detecting documents pertaining to subjects that are stored in the document repositories. A plurality of workflow modules subscribe to the DNDS to receive documents identified that pertain to subscribed subjects. At least two workflow modules produce documents that are published to the document repositories. Further, a first workflow module publishes to one of the document repositories a first document which is detected by the DNDS and which pertains to at least one subscribed subject of a second workflow module. Subsequent to the publication of the first document by the DNDS to the one of the document repositories, the DNDS delivers the first document to the second workflow module that operates independent from the first workflow module to produce a second document.

15 Claims, 3 Drawing Sheets

U.S. PATENT DOCUMENTS

| | | | |
|---|---|---|---|
| 2003/0069867 A1* | 4/2003 | Coutts et al. | 706/20 |
| 2004/0019613 A1 | 1/2004 | Jones et al. | 707/200 |
| 2004/0107112 A1* | 6/2004 | Cotter | 705/1 |
| 2004/0107192 A1* | 6/2004 | Joao | 707/3 |
| 2005/0060382 A1* | 3/2005 | Spector et al. | 709/213 |

OTHER PUBLICATIONS

U.S. Appl. No. 10/202,027 entitled "Electronic Filing System With Scan-Placeholders", filed Jul. 25, 2002.

* cited by examiner

INTEGRATING A DOCUMENT MANAGEMENT SYSTEM WITH A WORKFLOW SYSTEM AND METHOD

BACKGROUND OF INVENTION

The disclosure relates generally to a workflow system and method therefor, and more particularly, to a workflow system that is triggered by documents delivered by a document notification and delivery service.

Generally, there exists an increasing amount of information contained in electronic documents available from numerous heterogeneous, widely distributed sources. Keeping up to date with recently published material relevant to a particular topic is a challenge. Document Notification and Delivery Services (DNDS) aim to facilitate this task by providing notification and delivery services for documents concerning specified subjects.

An example of a document notification and delivery service is Yaka that is described in the following publications which are incorporated herein by reference: Damian Arregui, Francois Pacull, Jutta Willamowski, "Yaka: Document Notification and Delivery Across Heterogeneous Document Repositories", in Proceedings of CRIWG 2001, Darmstadt, Germany, Sep. 6-8, 2001; and European Patent Application EP 1111518 A1, entitled "System And Method For Document Notification And Delivery Across Heterogeneous Document Repositories".

As described in the publications, Yaka applies a four step solution that involves document detection, processing, notification, and delivery. More specifically, Yaka detects new documents published in each information source. It performs a first level of relevance filtering based on the document's properties (e.g., keywords, location, type, correlation with sample documents, etc.). Yaka then processes information by extracting meta-information (e.g. summary, language, authors, etc.) from the documents, sometimes using complementary linguistic services. Yaka subsequently sends notification e-mail containing the document meta-information to all interested users (i.e., subscribers). Finally, Yaka delivers on demand document content to the requesting users by transforming the document into the appropriate format depending on the selected delivery medium (e.g. e-mail, printer, PDA).

The concept of subjects is central to Yaka. Subjects act as distribution channels for documents relevant to a particular topic. A subject can be seen as a collection of views on different information sources. In order to fine-tune the subject definitions, Yaka allows filters to be defined on top of the information sources. Once a subject is defined, users can subscribe to it. When subscribing to a subject each user defines subject related preferences. In defining a subject related preference, the user also specifies a preferred delivery media and a preferred notification and delivery scheme. Then Yaka notifies the user of newly published documents. Upon receipt of a document notification, the user can request document delivery.

In addition, there exist document-centered workflow management systems (WFMS) for defining, managing, and executing workflow processes containing sets of interrelated tasks, which produce and consume documents. The WFMS handles and distributes these documents to users, assigned to complete tasks associated with the documents, according to a predefined process description. U.S. Pat. Nos. 6,493,731 and 6,505,219, which are incorporated herein by reference, are examples of a WFMS in which process descriptions describe the flow of work and responsibility of tasks defining a process description. A task is completed when the person responsible for the task prepares a task document. The process description completes when the final task in the process description is completed.

The aforementioned systems, however, are not integrated and do not readily allow flexibility of design. For example, they do not allow exceptions of a workflow system to be easily managed. Accordingly, it would be desirable to provide a system that solves these and other problems.

SUMMARY OF INVENTION

In accordance with the invention, a document management and delivery service (DNDS) is coupled to one or more document-centered workflow management systems to allow users more flexibility in defining workflow processes. Generally, the document notification and delivery service is used to trigger a workflow process. The workflow process in turn produces documents that the document management and delivery service detects and distributes to other, independently operating, workflow processes. The document notification and delivery service provides flexible document distribution channels that facilitate the circulation of documents between independently operating workflow processes that take as input and produce as output documents.

In accordance with one aspect of the invention, a document management system includes one or more document repositories for storing documents. In addition, a document notification and delivery service (DNDS) detects documents pertaining to subjects that are stored in the document repositories. A plurality of workflow modules subscribe to the DNDS to receive documents identified that pertain to one or more subscribed subjects. At least two workflow modules produce one or more documents that are published to one or more of the document repositories. Further, a first workflow module publishes to one of the document repositories a first document which is detected by the DNDS and which pertains to at least one subscribed subject of a second workflow module. Subsequent to the publication of the first document by the DNDS to the one of the document repositories, the DNDS delivers the first document to the second workflow module that operates independent from the first workflow module to produce a second document.

Advantageously, by integrating DNDS and WFMS, independently operating workflow management systems may be interconnected without their requiring any knowledge about the other. In addition, a workflow management system may be advantageously used with a DNDS to recover should the delivery of documents or notifications by the DNDS fail. Also, exception handling is simplified because the described embodiments couple workflow modules that are not aware of each other. Further advantages may be realized because workflow modules can be readily added and removed from the overall system; for example, changes to processes performed by the different workflow modules may be readily combined into a single workflow module or segmented into several workflow modules without affecting other workflow modules in the overall system.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
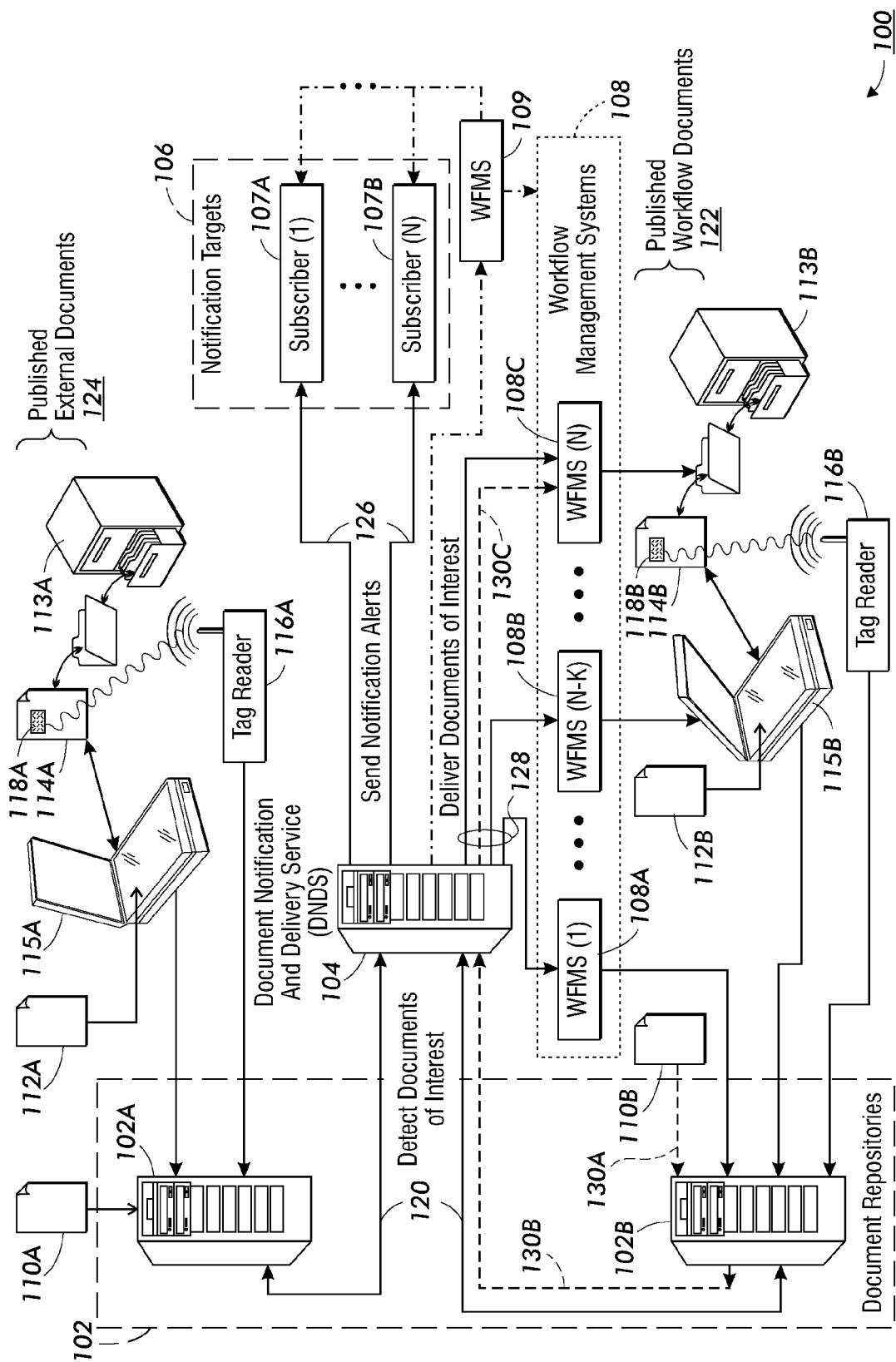
FIG. 1 illustrates an operating environment for performing exemplary embodiments of the present invention.

FIG. 1 illustrates an operating environment of a document management system 100 for performing exemplary embodiments of the present invention. The operating environment includes one or more document repositories 102, one or more document notification and delivery services (DNDS) 104, one or more notification targets 106, and two or more workflow management systems (WFMS) 108. The notification targets include subscribers 107.

The document repositories 102 are electronically managed on a document server and may be populated or published to by external documents at 124 or by WFMS 108 at 122. Documents populating the repositories 102 may be electronically generated documents 110. Alternatively, documents populating the repositories 102 may be electronic documents converted from a hardcopy document 112 recorded at for example scanner 115. Also, documents populating the repositories 102 may be identified from an electronic tag 118 on a hardcopy document 114 stored in a hardcopy repository 113, which tag 118 may be identified by an electronic tag reader 116. Documents identified with an electronic tag 118 may in addition be scanned at scanner 115.

Hardcopy documents scanned at scanner 115 are in one embodiment processed using optical character recognition, as available in FlowPort offered by Xerox Corporation or PaperPort offered by ScanSoft Inc., to identify textual or structural content in bitmapped image data. The electronic tag 118 contains an identifier that permits the document repository 102A to know the properties of a hardcopy document 114A including the file location 113A at which it is stored. A system for identifying and tracking tagged documents is described in U.S. patent Nos. incorporated herein by reference: U.S. Pat. Nos. 6,542,083; 6,340,931; 6,422,474; 6,342,830; 6,573,916; 6,446,208.

Figure 2:
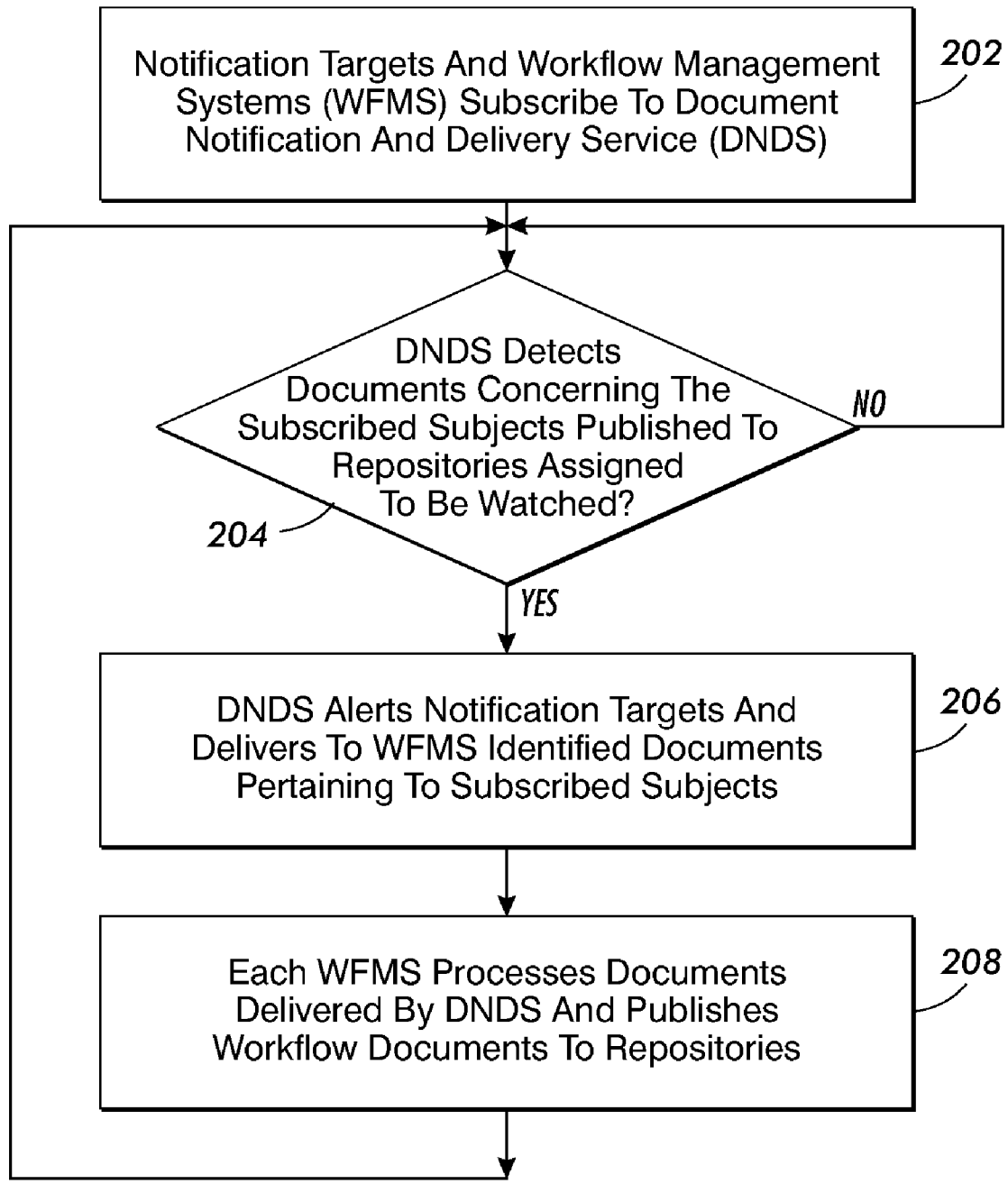
FIG. 2 illustrates a flow diagram detailing the general operation of the workflow management system and document notification and delivery service shown in FIG. 1.

FIG. 2 illustrates a flow diagram detailing the general operation of the workflow management system and document notification and delivery service 104 shown in FIG. 1. At 202, the notification targets 106 and WFMS 108 subscribe to subjects of the DNDS 104. The DNDS, subsequently at 204 (also shown in FIG. 1 at 120), detects documents concerning subjects subscribed to at 202 that have been published to repositories 102 assigned to be watched. In one embodiment, the repositories 102 are assigned to be watched by the notification targets 106 and the WFMS 108 that may be published to by WFMS 108 at 122 or by users external to the document management system 100 at 124.

If no documents are detected concerning the subscribed subjects at 204, then the DNDS 104 repeats the detection process after some period of delay. However, if at 204 documents are detected concerning the subscribed subjects, then at 206 the DNDS alerts notification targets 106 (shown in FIG. 1 at 126) and delivers to the WFMS 108 the identified documents that pertain to the subscribed subjects (shown in FIG. 1 at 128). Each WFMS 108 processes documents delivered by the DNDS 104 in accordance with the process description of its workflow, and upon completing the workflow, the WFMS 108 at 208 publishes the output of the workflow in the form of a document to one of the repositories 102 (shown in FIG. 1 at 122).

Figure 3:
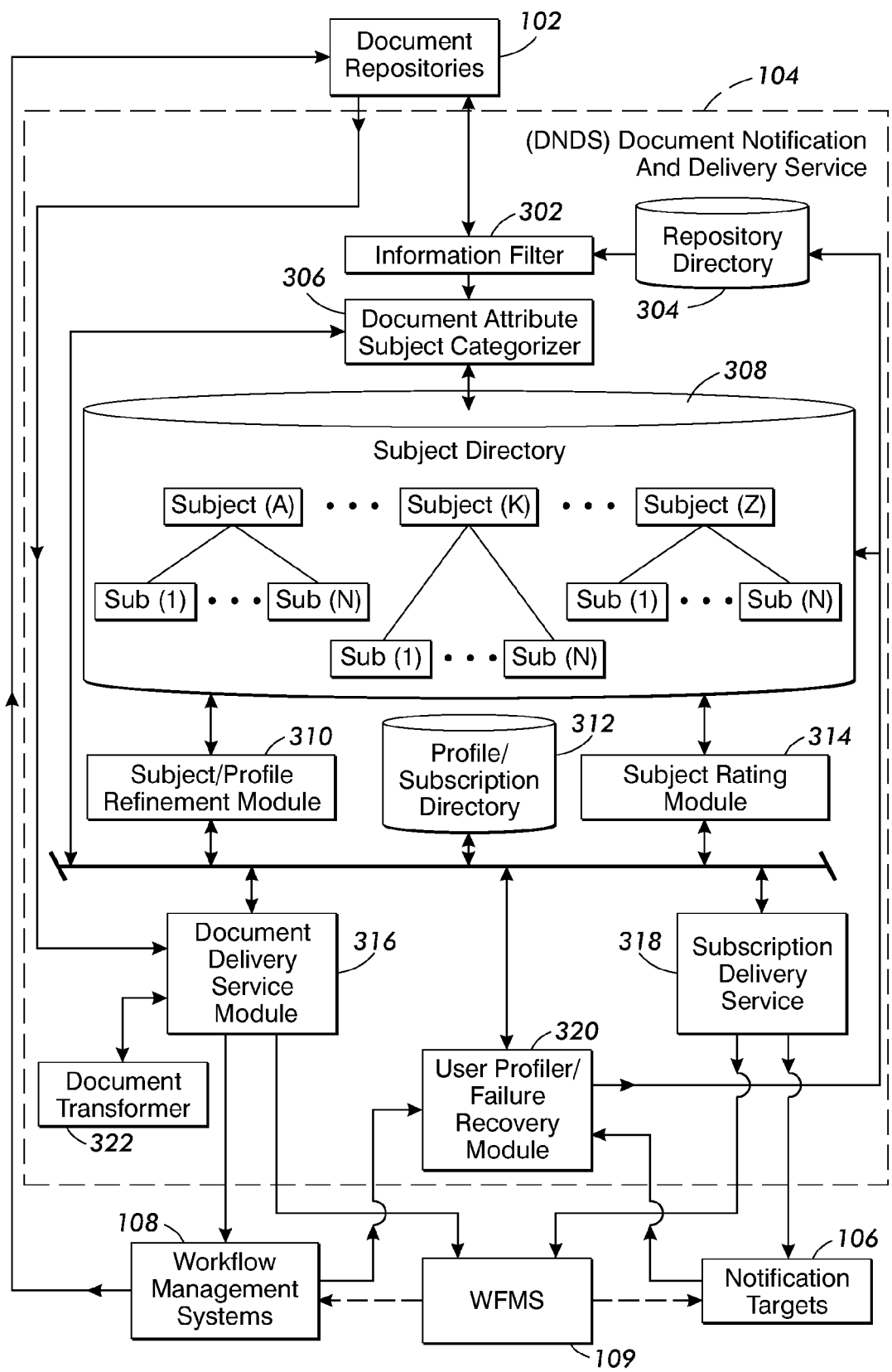
FIG. 3 illustrates one embodiment of the DNDS shown in FIG. 1.

FIG. 3 illustrates one embodiment of the DNDS 104 shown in FIG. 1 that operates in accordance with the exemplary embodiments of the present invention. The DNDS 104 includes an information filter 302 for monitoring and filtering information retrieved from document repositories 102 identified in repository directory 304 to identify document attributes derived from its content or its electronic tag 118. The identified attributes are categorized by document attribute subject categorizer 306 using subject directory 308. The subject directory 308 is composed of directories, and any number of subdirectories thereof, that further refine subjects (e.g., a subject may be divided into sub-classifications of the subject).

The workflow management systems 108 and notification targets 106 define profiles that are stored in profile/subscription directory 312 through user profiler 320. Each profile recorded in the profile/subscription directory 312 allows users to specify subjects and repositories of interest, for receiving either documents or notification of identified documents matching specified subjects. As part of the profile, users may specify preferred and alternate delivery methods (e.g., an identified email address or printer) or document formats or processing to be applied before delivery (e.g., translation, summarization, enrichment). In addition, subjects and directories specified by users are recorded in the subject directory 308 and the repository directory 304, respectively.

Documents in the repositories 102 identified as having attributes that match subjects subscribed to by either the workflow management systems 108 or notification targets 106, are either distributed to workflow management systems 108 by document delivery service module 316 or notified thereof by subscription delivery service 318, respectively. As part of document delivery performed by the document delivery module 316, transformation to alternate document formats or analysis thereof (e.g., morphological analysis, and part-of-speech disambiguation) may be performed by document transformer 322 before delivery.

B. Independent Workflow Modularization

Referring again to FIG. 1, aspects of the exemplary embodiments are described in this section relating to independent workflow modularization. As shown in FIG. 1, each WFMS in the set of two or more workflow management systems or workflow modules 108 are adapted to operate independently. That is, no interaction is required between, for example, workflow module 108A and workflow module 108B in order for the document management system 100 to operate property. The workflow modules 108 may consist of workflows carried out in any number of different forms such as a web service or a physical process.

Advantageously, the document management system 100 provides a modular system in which different workflow management systems (e.g., workflow module 108A) can be substituted, replaced, or removed from the set of two or more workflow management systems 108 without affecting the performance or operation of the document management system 100. As a further advantage, the modular system enables any one of the plurality of workflow management systems 108 to be driven by input from any of the plurality of workflow management systems 108.

For example, the WFMS 108A may produce as output electronic document 110B that is published to document repository 102B (as indicated at 130A) and the workflow module WFMS 108C may have subscribed to a subject of interest to the DNDS 104 that pertains to the published document 110B. The DNDS 104 may subsequently identify the published document 110B (as indicated at 130B) and deliver the published document 110B in the specified profile and format to WFMS 108C (as indicated at 130C). Upon receipt of the document 110B, the WFMS 108C can be triggered (either automatically, manually through user intervention, or a combination of both) to initiate a workflow process description to produce, for example, output hardcopy document 114B.

Alternatively, the DNDS 104 could identify and deliver a notification message of the document 110B to a subscriber such as subscriber 107A. In this alternate embodiment, the notified subscriber could initiate one more of the workflow management system 108 by requesting delivery (with possibly format or analysis performed thereto before delivery) of the document identified in the notification message thereto or by manually starting the workflow management system with or without the document 110B.

More generally, the document management system 100 allows documents to be published to the document repositories (or information sources) 102 that are monitored by the DNDS 104. In addition, documents produced by the workflow management systems 108 are published to the document repositories 102 that are monitored by the DNDS 104. The DNDS 104 detects documents of interest published to the repositories 102, through either distribution channel, and distributes to subscribed workflow management systems 108 or notifies subscribed notification targets 106 of published documents the DNDS identifies with attributes that align with selected subjects.

C. ILLUSTRATIVE EXAMPLES

By way of a first example consider a large organization that has geographically distributed locations, with each location having its own well-established hiring process (that can be defined as a workflow). The locations cooperate with each other by sharing information about interested candidates they do not decide to hire because of lack of need. The process is initiated by the DNDS 104 by identifying and delivering to each resource department subscribed for document notifications related to resumes (i.e., CVs) posted on public document repositories 102A. These CVs are reviewed by the subscribers 107 of the human resource department to filter out and select CVs of interest. Those CVs of interest are published to a proprietary document repository 102B that is either subscribed to by location hiring workflows or by subscribers 107.

In addition, notification targets (e.g., human resource, managers, etc.) and location hiring processes (i.e., location WFMS) subscribe to the DNDS 104 for information relevant to their needs published to the proprietary document repository 102B. Documents of interest identified by the DNDS 104 are distributed to subscribed notification targets 106 or hiring WFMS 108. Once a hiring workflow is initiated by the delivery of a CV or other document (e.g., CV review), the WFMS 108 begins processing the CV through each stage of the WFMS's process description, during which an evaluation document is produced as output upon completing the process description unless terminated by an exception during the process. The output document is stored in the proprietary document repository 102B, thereby allowing access thereto to interested subscribers through identification and notification by the DNDS 104 for initiating an additional WFMS 108.

By way of a second example, the DNDS 104 and the WFMS 108 can be used to form a technology watch initiative. Reviewers of different technologies subscribe to subjects watched by the DNDS 104. Whenever a technology reviewer receives news about a technology, the technology reviewer initiates an instance of a workflow of WFMS 108 that concerns technology evaluation. The workflow concerned with technology evaluation initiated by the technology reviewer includes an organization of experts that review and produce a technology report. Once the technology report is complete, it is published to a document repository 102 that is monitored by the DNDS 104. Thus, users can subscribe to the DNDS for one published report 104, instead of having to watch and evaluate different publications concerning technologies watched by the technology reviewers.

By way of a third example, the DNDS 104 and the WFMS 108 can be used to form a invention disclosure submission and patent procurement system. In this embodiment, invention disclosures 124 are published to a document repository 102A. Invention disclosure submissions may take the form of electronic submissions 110A or hardcopy submissions 112A or 114A. Such submissions are published to the document repository 102A. Hardcopy invention disclosures submissions may be scanned using scanner 115A and recorded in the document repository 102A. Alternatively, hardcopy invention disclosures may be tagged with an electronic tag 118A with properties that may be read by tag reader 116A.

The hardcopy submissions may be filed in an appropriate hardcopy repository 113A corresponding to newly submitted invention disclosures. The tag reader 116A may read the tag 118A on the hardcopy document 114A and identify that the document 114A has been submitted and a reference thereto or a scanned copy or placeholder therefor is stored in the document repository 102A. Simultaneous with filing the hardcopy document 114A in the hardcopy repository 113A, or at some point thereafter by satisfying a scan placeholder, the paper submission 114A may be scanned using scanner 115A. Scan placeholders are further described in U.S. patent application Ser. No. 10/202,043, entitled "Electronic Filing System With File-Placeholders" and Ser. No. 10/202,027 entitled "Electronic Filing System With Scan-Placeholders", which are both incorporated herein by reference.

After submission of invention disclosures, the DNDS 104 detects new submissions in the document repository 102A. Depending on the subject matter of the invention disclosure, they are delivered to different WFMS 108 that are responsible for evaluating their technical merit. Upon review, a "technical" report in the form of a document published workflow document 122 (in any of the forms similar to invention disclosures, e.g., 110B, 112B, or 114B) to a document repository 102B. The publication of these technical reports are detected by the DNDS 104 and delivered depending on their subject matter to different WFMS 108 (as illustrated by the path defined by 130A, 130B, and 130C) that are responsible for assessing the overall strategic fit of the invention disclosure to determine the most appropriate action to take (e.g., whether to file a patent application, keep it as a trade secret, do nothing, or publish it). These WFMS 108 publish an "overall" report in the form of a document 122 to the document repository 102B that corresponds to the action decided upon.

The DNDS 104 subsequently detects the published overall reports in the document repository and delivers, depending on their subject matter, to WFMS 108 responsible for carrying out the action decided upon for the particular invention disclosure. For example, depending on the subject matter of the invention disclosure, it may be assigned to a WFMS 108A responsible for preparing and filing patent applications relating to a specific class of technology. Once a patent filing takes place, the WFMS 108A can be driven by documents 124 received from patent offices and published to the repository 102A. In addition, during the process interested parties such as inventors and managers can be defined as notification targets 106 and alerted when events are about to occur or have occurred, such as when a patent is published, allowed, or issued.

D. Identifying Highly Rated Documents for Cross-Subject Distribution

Referring again to FIG. 3, aspects of the exemplary embodiments are described in this section relating to the distribution of documents across pre-defined subjects once they are given very high ratings for their subject matter in their assigned or classified subject category by categorizer 306. These identified highly rated documents are evaluated by subject rating module 314 using preselected system and usage parameters to determine if the documents should be disseminated across pre-defined subjects and subscribed users. Generally, the module 314 monitors information concerning detected documents for which notification or delivery have been performed by modules 316 and 318, and uses the monitored information to identify ones of the detected documents as highly rated documents for notification to users not originally subscribed to the subject for which the notification or delivery was performed.

In operation, the subject rating module 314 monitors and records different kinds of application-specific system and usage parameters (possibly in any combination of real-time, batch mode, and parallel) of operations performed by other elements of the DNDS 104. For example, the subject rating module 314 monitors events (e.g., deletion, modification, notification and/or delivery) and attributes (e.g., changes to metadata) of detected documents. Some events and attributes are detected using the information filter 302 that monitors document: timestamp data, metadata, and source location. Other events and attributes are detected using the document delivery service module 316 and the subscription delivery service module 318 that include monitoring: timestamp information concerning the delivery and/or notification, the subject through which a document has been published and/or notified, the identifier of the document, the source of the document, the type and number of users to which the delivery and/or notification is directed, and the delivery medium of the document delivery and/or notification (e.g., printer, email, file server). Yet other events and attributes are detected using information concerning new collections of documents created on repositories of a monitored information source, such as, when the collection was detected, an identifier for the collection, and a parent collection identifier.

It will be appreciated by those skilled in the art that many additional events and attributes may be monitored by the subject rating module 314 to determine whether a document should be given a high rating and considered candidates for large-scale dissemination across boundaries of pre-defined subjects and subscribed users to those subjects. For example, the monitored information can be used to define different criteria thresholds. For instance, documents provided in notification alerts 126 can be assigned high ratings if the documents have been requested for delivery by a large number of users or at least a minimum number of specifically identified users (e.g., that are recognized as experts in a community).

Documents that are detected as having a high rating and thereby meriting distribution across boundaries of pre-defined subjects and subscribed users may be disseminated through different notification targets 106 such as: (a) subscribed users; (b) subscribed collaborative filtering and recommender systems (e.g., Knowledge Pump developed by Xerox Corporation); (c) subscribed intelligent mediums (e.g., coversheets produced by Smart Printers developed by Xerox Corporation); and (d) public displays (e.g., Community Wall developed by Xerox Corporation).

In one alternate embodiment, a specific notification target 106 (or customized distribution channel subject) is dedicated to disseminating documents which have been identified as having cross-subject boundary value to users. When notifying users registered to be notified for this customized distribution channel, the original subjects through which the document was distributed or published are provided, in addition to, other information concerning the document for which the notification or delivery is taking place. The cross-subject boundary category may be customized as any other subject category in accordance with user preferences and needs.

E. Subject and User Profile Refinement

Referring again to FIG. 3, aspects of the exemplary embodiments are described in this section relating to subject refinement performed by subject/profile refinement module 310 to improve the accuracy of documents categorized by categorizer 306. As described in this section, the DNDS 104 uses the subject/profile refinement module 310 to improve the efficiency and quality of document delivery and notification.

In operation similar to the subject rating module 314, the subject/profile refinement module 310 monitors and records system and usage parameters (possibly in any combination of real-time, batch mode, and parallel) of operations performed by other elements of the DNDS 104. Also similar to the subject rating module 314, the subject/profile refinement module may compute as a usage parameter the ratio of the number of document delivery request to the total number of document notifications for a subject. A high value for the ratio may indicate that users tend to be interested in the documents that they have been notified of while a low value for the ratio may indicate the subject definition is too broad and has not found its target audience.

Subject refinement is carried out by the subject/profile refinement module 310 to more accurately identify and timely distribute relevant information for the notification target 106 and/or WFMS 108. Once an initial hierarchy of subjects in the subject directory 308 is defined for example manually or using a pre-existing hierarchy, the subject/profile refinement module 310 uses the monitored and recorded system usage parameters to trim, suppress, create, or expand a subject in the subject directory 308.

A given subject may be trimmed (i.e., removed or suspended) from the directory 308 if the number of documents requested by the users from an information source within the given subject drops under a given threshold. A given subject may be suppressed from the directory 308 if low activity is detected for a subject, either because no new documents are detected in the given subject or because the ratio of delivery to notification is low for documents in that subject.

New subjects or sub-classes of subjects may be created if several clusters with high activity are detected. For example, a cluster of users requesting documents from a cluster of sources within a single subject or a group of subjects. In the event such a cluster is identified, a new subject associated with the cluster of sources is defined and every user associated with the cluster are invited to subscribe to the new subject.

In addition to creating new subjects, existing subjects can be expended with additional sub-categories. That is, new collections of documents that are identified within information sources that are related to an existing subject can be added as a sub-category of the subject. In one embodiment, keyword matching is performed on a pre-defined collection of documents to identify the new collections.

Subjects that are refined may require consensus of a system administrator and/or subscribed users to the refined subjects. Since subjects are lightweight virtual channels that link users to information sources, one embodiment retains subjects that have been trimmed or suppressed to provide backward subject compatibility, thereby allowing users to use either an existing hierarchy or an evolving hierarchy.

In addition to subject refinement described in the prior section, the subject/profile refinement module 310 refines user profiles in the profile/subscription directory 312. In one embodiment, delivery/notification, subscription, and viewing preferences of a user profile are modified to improve user interaction with the DNDS 104 through continuous refinement. Similar to subject refinement, the decision to modify the preferences of a user profile may or may not require input from the user corresponding to the user profile that is being refined.

In one embodiment, the delivery/notification mode of a user (as for example defined in a user profile) is automatically refined or proposed to a user by module 310. Modifications are made according to: (a) the frequency that a user requests delivery of documents in response to document notifications sent concerning each subscribed subject, and (b) the frequency that a user switches between "notification and delivery" and "direct delivery" based on, for example, the recurrence of the subject category of the documents concerned.

Additional modifications to delivery and notification may be suggested to users depending on specified parameters such as delivery frequency/quantity to switch between frequency of deliveries (e.g., weekly, monthly, etc.) or quantity for each delivery (e.g., per document, n-bundled documents, etc.). Alternatively, the system may suggest that a user unsubscribe or change the frequency of delivery when document delivery requests for document notifications fall below a predefined threshold level.

In addition adjustments to a user's notification and delivery profile, a profile setting forth a user's preferred manner of viewing subject categories of documents may be personalized with customized views for subscribed subjects. For example, some subjects may be viewed according to an existing hierarchy or an evolving hierarchy. Accordingly, the DNDS 104 may provide users with the ability to view hierarchical refinements made to the subject directory without requiring a user to accept the refinements.

F. Notice or Document Delivery Failure Recovery

Referring again to FIGS. 1 and 3, aspects of the exemplary embodiments are described in this section relating to recovery performed by the failure recovery module 320 in the event of failure of document delivery or notification. By monitoring system and usage parameters, the failure recovery module 320 assists in performing failure recovery. Similar to the subject rating module 314 and the subject/profile refinement module 310, the failure recovery module 320 monitors and records system and usage parameters of operations performed by other elements of the DNDS 104. In addition, the failure recovery module 320 monitors and records system and usage parameters of detected component failures (e.g., failure of component, time when failure was first detected, and time when component was last accessed).

The DNDS 104 is intended to be deployed across a wide-area network, such as, the Internet or intranets on which different types of failures may occur, such as, network partition and host failures. The failure recovery module 320 helps the DNDS 104 adapt to and correct identified failures to preserve as much as possible the functionality of the DNDS 104. The solution identified by the failure recovery module 320 will depend on the selected delivery media and the affected document repository 102.

In one embodiment, the inability to extract meaningful results by the information filter 302 when examining documents or web pages at the document repositories 102 is detected by the failure recovery module 320. Generally, the failure recovery module 320 detects problems with wrappers that automatically retrieve information from an information source. To detect errors, the failure recovery module 320 calculates and records the average number of new and modified document for each information source identified by the information filer 320 at predefined periods of time. In the event the measured value differs significantly from one period to the next, then the failure recovery module 320 notifies concerned users or system administrators.

In the event the failure recovery module 320 detects a delivery medium is no longer available, then document delivery service module 316 and the subscription service module 318 can either wait for replacement or repair the delivery medium or deliver the document or notification to a different delivery medium or a replacement delivery medium. For example, delivery of a document or notification to a faulty printer may be replaced by another printer located proximate to the faulty printer or replaced with another medium such as email or archival in a document repository. Alternatively, the document delivery service module 316 and the subscription service module 318 can deliver their failed notifications or deliveries to WFMS 109, which will manage the recovery process as a workflow (either as a module exterior to or integrated in the DNDS 104).

A recovery strategy can be predefined in the profile directory 312 for each user that defines alternative delivery mediums ordered by preference in the event of the failure of preferred delivery medium. Alternatively upon a detected failure, the failure recovery module 320 may propose a list of alternatively available delivery media. In any embodiment, the failure recovery module 320 has some delay (either implicit through computational delays or explicit using an associated system delay for a preset period of time) once the problem is identified during which replacement or repair of the delivery medium may have occurred and in which case alternative recovery actions are not required. In any embodiment, the failure recovery module 320 keeps users informed of identified failures by email or an alternative communication channel.

In addition, reliability profiles of document repositories (and information sources) 102 can be defined using recorded component failure information associated with document repositories or information sources. Depending on the frequency and duration of failures of document repositories or information sources that are observed by the failure recovery module, the repositories or sources can be classified as having one of a predefined number of operating behaviors (e.g., very reliable, reliable, unreliable, and very unreliable). The classification of a failed repository or source is used to dynamically adapt to failures and determine appropriate action to take in response to identified failures. For example, a source identified as being very reliable may cause the failure recovery module 320 to wait for a predefined period of time before reattempting to communicate with the repository or source and taking alternative action.

G. Miscellaneous

Using the foregoing specification, the exemplary embodiments may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the exemplary embodiments. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the exemplary embodiments.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the exemplary embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the exemplary embodiments as set forth in the claims.

While particular embodiments have been described, alternatives, modifications, variations, improvements, and substantial equivalents that are or may be presently unforeseen may arise to applicants or others skilled in the art. Accordingly, the following appended claims as filed and as they may be amended are intended to embrace all such alternatives, modifications variations, improvements, and substantial equivalents.

The invention claimed is:

1. A document management system, comprising:
    a plurality of document repositories for storing documents;
    a document notification and delivery service (DNDS) for detecting documents pertaining to subjects of interest that are stored in the document repositories;
    a plurality of notification targets for subscribing to subjects at the DNDS to receive alerts when documents are identified that pertain to one or more subscribed subjects of interest; and
    a plurality of workflow modules, that can be added or removed, subscribing to the DNDS to receive documents identified that pertain to one or more subscribed subjects of interest; at least two workflow modules automatically producing one or more documents that are published to one or more of the document repositories without user intervention;
    wherein a first workflow module publishes to one of the document repositories a first document which is detected by the DNDS and which pertains to at least one subscribed subject of interest of a second workflow module;
    subsequent to the publication of the first document by the DNDS to the one of the document repositories, the DNDS processes the first document and then delivers the first document to the second workflow module that does not require the first workflow module to produce a second document;
    the DNDS includes:
    a plurality of document repositories, each storing a plurality of documents;
    a subject directory for representing subjects of the plurality of documents in the plurality of document repositories;
    a profile directory for representing a plurality of users accounts, each user account subscribing to at least one subject of interest;
    a subject refinement module for:
        monitoring document notifications and delivery requests associated with the document notifications to provide subject refinement data;
        using the subject refinement data to refine subjects in the subject directory;
        deleting a subject in the subject directory based on access activity of a subject; and
        adding a subject to the subject directory based on access activity of a cluster of sources within a subject; and
    a failure recovery module for:
        recording component failure information;
        assigning each of the document repositories according to one of a plurality of operating behaviors using the component failure information; and
        determining appropriate action to take in response to component identified failures using the operating behavior assigned to the document repository to which the component is associated;
    the plurality of operating behaviors indicate a degree of reliability;
    the appropriate action is predefined in a profile directory of the user accounts; and
    one of the at least two workflow modules is associated with a user that performs one or more tasks to produce one or more documents that are managed by a workflow module according to subject matter described in the one or more documents.

2. The document management system according to claim 1, wherein one of the plurality of workflow modules is one of a web service and a process associated with a user that performs one or more tasks to produce the one or more documents.

3. The document management system according to claim 1, wherein the DNDS processes the first document by performing one of summarization, enrichment, and translation.

4. The document management system according to claim 1, wherein the DNDS further comprises means for:
    (a) monitoring events and attributes concerning detected documents for which notification or delivery are performed; and
    (b) using the monitored events and attributes to identify ones of the detected documents as highly rated documents for notification to users not originally subscribed to the subject of interest for which the notification or delivery is performed, the highly rated documents having been requested for delivery by at least a minimum number of predetermined users.

5. The document management system according to claim 1, wherein the DNDS further comprises:
    a profile directory for representing a plurality of users accounts, with each user account subscribing to at least one subject of interest; and
    a profile refinement module for refining user preferences for document notification and delivery.

6. A method for operating a document management system, comprising:
- storing a plurality of documents in a plurality of document repositories;
- detecting documents pertaining to subjects of interest based on subject matter of content of the documents that are stored in the document repositories with a document notification and delivery service (DNDS);
- subscribing to the DNDS to receive documents identified that pertain to one or more subscribed subjects of interest with a plurality of workflow modules that can be added or removed;
- representing subjects of the plurality of documents in the plurality of document repositories with a subject directory;
- representing a plurality of user accounts, each user account subscribing to at least one subject of interest with a profile directory;
- monitoring document notifications and delivery requests associated with the document notifications to provide subject refinement data;
- using the subject refinement data to refine subjects in the subject directory;
- deleting a subject in the subject directory based on access activity of a subject;
- adding a subject to the subject directory based on access activity of a cluster of sources within a subject;
- recording component failure information;
- assigning each of the document repositories according to one of a plurality of operating behaviors using the component failure information; and
- determining appropriate action to take in response to component identified failures using the operating behavior assigned to the document repository to which the component is associated;
- wherein the plurality of operating behaviors indicate a degree of reliability;
- wherein the appropriate action is predefined in a profile directory of the user accounts;
- wherein (i) at least two workflow modules automatically produce one or more documents that are published to one or more of the document repositories without user intervention, (ii) a first workflow module publishes to one of the document repositories a first document which is detected by the DNDS and which pertains to at least one subscribed subject of interest of a second workflow module, and (iii) subsequent to the publication of the first document by the DNDS to the one of the document repositories, the DNDS delivers the first document to the second workflow module that does not require the first workflow module to produce a second document; and
- wherein one of the at least two workflow modules is associated with a user that performs one or more tasks to produce one or more documents that are managed by a workflow module according to subject matter described in the one or more documents.

7. The method according to claim 6, further comprising subscribing with notification targets to subjects at the DNDS to receive alerts when documents are identified that pertain to one or more subscribed subjects of interest.

8. The method according to claim 6, wherein one of the plurality of workflow modules is one of a web service and a process associated with a user that performs one or more tasks to produce the one or more documents.

9. The method according to claim 6, further comprising processing the first document at the DNDS before delivering it to the second workflow module.

10. The method according to claim 9, wherein said processing comprises one of summarization, enrichment, and translation.

11. The method according to claim 6, wherein the method further comprises at the DNDS:
 (a) monitoring events and attributes concerning detected documents for which notification or delivery are performed; and
 (b) using the monitored events and attributes to identify ones of the detected documents as highly rated documents for notification to users not originally subscribed to the subject of interest for which the notification or delivery is performed, the highly rated documents having been requested for delivery by at least a minimum number of predetermined users.

12. The method according to claim 6, further comprising:
- storing a plurality of documents at a plurality of document repositories;
- representing subjects of the plurality of documents in the plurality of document repositories with a subject directory;
- representing a plurality of users accounts with a profile directory, where each user account subscribing to at least one subject of interest;
- monitoring frequency of user delivery requests for document notifications concerning each subscribed subject of interest to provide profile refinement data; and
- using the profile refinement data to refine user preferences for document notification and delivery.

13. An article of manufacture for operating a document management system, the article of manufacture comprising computer usable hardware media including computer readable instructions embedded therein that causes a computer to perform a method, wherein the method comprises:
- storing a plurality of documents in a plurality of document repositories;
- detecting documents pertaining to subjects of interest based on subject matter of content of the documents that are stored in the document repositories with a document notification and delivery service (DNDS);
- subscribing to the DNDS to receive documents identified that pertain to one or more subscribed subjects of interest with a plurality of workflow modules that can be added or removed;
- representing subjects of the plurality of documents in the plurality of document repositories with a subject directory;
- representing a plurality of users accounts, each user account subscribing to at least one subject of interest with a profile directory;
- monitoring document notifications and delivery requests associated with the document notifications to provide subject refinement data;
- using the subject refinement data to refine subjects in the subject directory;
- deleting a subject in the subject directory based on access activity of a subject;
- adding a subject to the subject directory based on access activity of a cluster of sources within a subject;
- recording component failure information;
- assigning each of the document repositories according to one of a plurality of operating behaviors using the component failure information; and
- determining appropriate action to take in response to component identified failures using the operating behavior assigned to the document repository to which the component is associated;

wherein the plurality of operating behaviors indicate a degree of reliability;

wherein the appropriate action is predefined in a profile directory of the user accounts;

wherein (i) at least two workflow modules automatically produce one or more documents that are published to one or more of the document repositories without user intervention, (ii) a first workflow module publishes to one of the document repositories a first document which is detected by the DNDS and which pertains to at least one subscribed subject of interest of a second workflow module, and (iii) subsequent to the publication of the first document by the DNDS to the one of the document repositories, the DNDS delivers the first document to the second workflow module that does not require the first workflow module to produce a second document; and wherein one of the at least two workflow modules is associated with a user that performs one or more tasks to produce one or more documents that are managed by a workflow module according subject matter described in the one or more documents.

14. The article of manufacture according to claim 13, wherein the method further comprises subscribing with notification targets to subjects at the DNDS to receive alerts when documents are identified that pertain to one or more subscribed subjects of interest.

15. The document management system according to claim 1, wherein the documents include an electronic tag located on each document.

* * * * *